United States Patent
Lassig et al.

[15] 3,685,233
[45] Aug. 22, 1972

[54] METHOD OF WELDING SHEETS, PARTICULARLY SHRINK-ON-SHEETS WHICH HAVE BEEN WRAPPED AROUND A PALLET CARGO AND APPARATUS THEREFOR

[72] Inventors: Harry Lassig; Anton Grosshauser, both of Hamburg-Schenefeld, Germany

[73] Assignee: Fordertechnik Hamburg Harry Lassig, Hamburg-Schenefeld, Germany

[22] Filed: June 16, 1970

[21] Appl. No.: 46,686

[52] U.S. Cl. ........................................53/33, 53/228
[51] Int. Cl. ........................B65b 11/20, B65b 49/00
[58] Field of Search....53/30, 184, 373, 29, 183, 159, 53/98, 33, 228

[56] References Cited

UNITED STATES PATENTS 3,481,107  12/1969  Andblad et al. ............53/48 X
3,514,920  6/1970  Hoffler et al..............53/184 X

OTHER PUBLICATIONS

" Signode Heavy–Duty Shrink–Film Packaging Systems" (Advertisement) Signode Corp., Chicago, Ill

*Primary Examiner*—Theron E. Condon
*Assistant Examiner*—Eugene F. Desmond
*Attorney*—McGlew and Toren

[57] ABSTRACT

A method of and an apparatus for welding plastic sheets wrapped around a pallet cargo. The welding device for welding the sheet wrapper in a vertical direction at the rear of the pallet comprises welding jaws and clamping jaws which are opened and closed by a motor adapted to apply a predetermined clamping pressure on the sheet during welding and cooling down of the welds. The upper open end of the sheet wrapper enveloping the cargo is sealed while the pallet passes through the apparatus. Toward this purpose, the upper marginal portions of the sheet wrapper are stretched by means of a slidable claw and a rotatable retaining arm, and are welded by a welding device arranged above the center of the pallet path.

7 Claims, 5 Drawing Figures

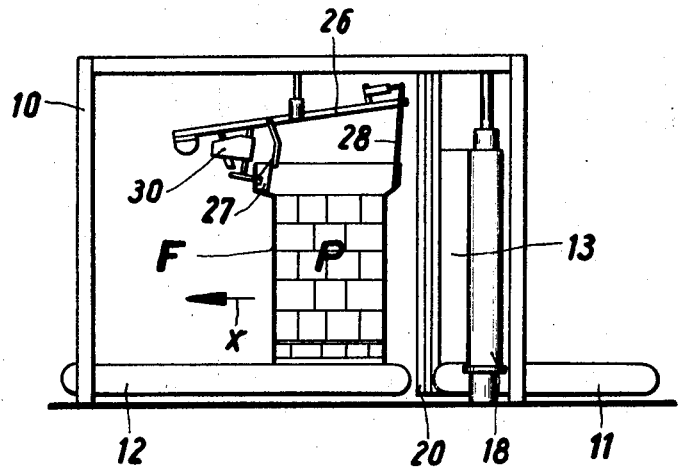
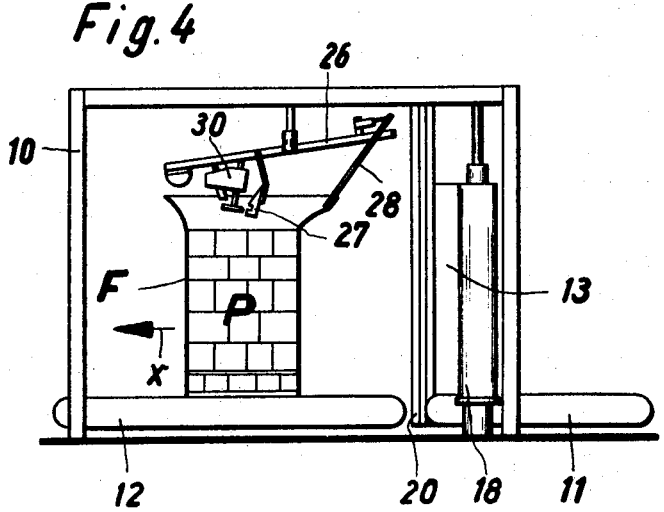

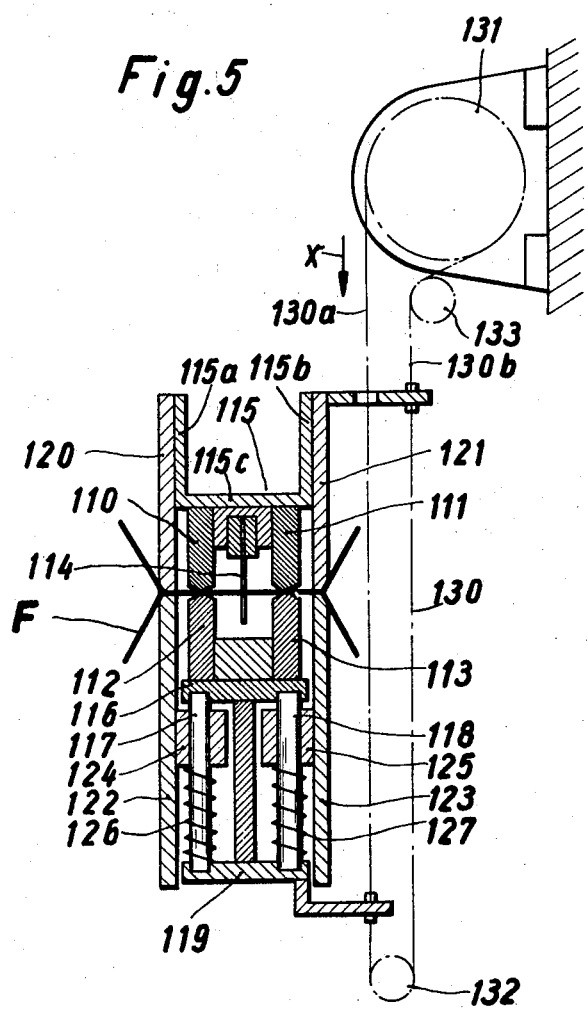

METHOD OF WELDING SHEETS, PARTICULARLY SHRINK-ON-SHEETS WHICH HAVE BEEN WRAPPED AROUND A PALLET CARGO AND APPARATUS THEREFOR

This invention relates to a method of and an apparatus for welding the upper marginal portions of sheets, particularly shrink-on sheets which have been wrapped around the cargo of loaded pallets wherein the pallets are advanced into a wall formed by the sheet and are enveloped by the sheet during the further advance of the pallet, then vertical welded seams are applied to the sheet by means of two pairs of oppositely driven welding jaw assemblies and thereafter the sheet is severed from a sheet supply by means of a severing knife or the like arranged between the welding jaws of the on pairs of welding jaw assemblies in thereby extending a freshly formed sheet wall.

Various methods and apparatus for wrapping pallets into shrink-on sheets have been devised in order to achieve some means of protection of the pallet cargo against ambient influences. In one known arrangement prefabricated plastic bonnets are drawn over the cargo on the pallet. Toward this purpose, the sheet which has been welded initially into the bonnet shape is manually pulled over the cargo. Then the plastic bonnet is attached to the pallet feet by means of staples, nails or the like. There are obvious drawbacks inherent in such a procedure. The manufacture of the bonnets by welding cut sheet sections which have been cut into certain sizes is relatively expensive. Moreover, for different pallets several bonnet sizes must be kept in stock. For achieving an hourly output of approximately 60 pallets, two additional operators are required for slipping on and fixing these bonnets.

Another practice heretofore employed involves wrapping the pallets into a shrink-on sheet which is withdrawn from reels. Thereby the pallet is wrapped automatically into the sheet, and the sheet is welded along its shorter length in the vertical direction. A disadvantage of this procedure is that the sheet merely circumscribes the cargo on the pallet and that the sheet is therefore open on the top. Although a good securing of the cargo is achieved when using sheet wrappers of this type, no protection against dust and moisture is obtained which fact is very disadvantageous if the cargo on the pallet is sensitive to moisture.

For welding polyethylene shrink-on or snap-on sheets either of two welding systems may be employed, i.e. thermal contact welding or thermal impulse welding. In thermal contact welding it is rather difficult to control the temperature, especially in relatively extended welding lengths so that thermal impulse welding is more commonly employed. In thermal impulse welding the sheet is compressed by two welding jaws or welding strips (filler rods) which are temporarily heated, and after cooling down of the welding strips the sheet is still held under compression until it has cooled down completely. This results in a reduction of the width of the welded seam in the proportion from about 25 to about 0.6 times 25. Although the strength of the weld is equivalent to that of the sheet, there is produced a "thinning" of the sheet to 0.6 times 5 directly adjacent the weld so that in most cases the weld has an insufficient strength for the stress which is subsequently developed. To remedy this drawback, thicker sheets than normally required are employed. This drawback is particularly pronounced in welding devices for sheets which have been wrapped around pallets.

In this type of wrapping apparatus for pallets there is a sheet reel arranged on either side of a conveyor track along which the loaded pallet is transported. The sheets are unwound from these reels, guided on their paths from the sides to the center of the transport path by one or several guide rollers and then welded in a vertical direction in the center of the transport path. When a pallet is advanced through this gate which is formed by the sheet material, the sheet is unwound from the supply reel and closely engages the pallet. Two welding jaws which are arranged on the outside of the guide rollers on either side of the transport path are moved toward the center after the pallet has entered the apparatus completely so that the sheet is thereby tightened around the rear edges of the pallet. Then two welded seams which have a predetermined spacing are applied and subsequently the sheet is severed between the welds. In this way, the welds on the rear of the pallet and on the sheet gate adapted to form the front side of the next pallet are formed simultaneously. Since during welding a high stress is developed in the sheet, the thickness of the sheet is reduced most at the hot transition zone from seam to sheet which is not held by the welding jaws.

It is therefore an object of the present invention to provide an improved method and apparatus for welding sheets particularly shrink-on sheets which have been wrapped around the cargo of loaded pallets and in which the above-mentioned drawbacks are avoided and by which loaded pallets may be enveloped with a sheet on all sides without requiring any manual labor. In achieving this object the invention proposes a method of the above-mentioned type wherein the sheet wall is held during the advance of the pallet into the sheet wall by a claw which is slidable along a guide track parallel to and inclined to the advancing direction of the pallet, then the sheet is pulled downwardly by an amount which is governed by the extension of the sheet in the advancing direction resulting from the unwinding of the sheet from supply reels and which is adapted to the required height extension reduction for bringing the two lateral upper marginal sheet portions into engagement with each other, then after severing the sheet wrapped around the cargo on the pallet from the sheet supply the two lateral upper marginal sheet portions are held in a sheet zone remote from the claw by means of a vertical retaining arm which is mounted at the front end of the guide track extending above the pallet and tiltable in a vertical plane in dependence upon the advance of the pallet, and finally these sheet portions are stretched and welded by means of a welding device arranged above the path of advance movement of the pallet.

The apparatus for carrying out this method, wherein the pallets are advanced by conveyors mounted on a frame into a sheet wall extending transversely to the advancing direction of the pallets and the sheet is unwound from vertical supply reels which are mounted on either side of the path of advance of the pallets and wherein these pallets are enveloped by the sheet during the further advance of the pallets and the vertical marginal portions of the sheet are welded together by a welding device and severed from the sheet supply by a severing device in simultaneously forming a new sheet wall, is characterized, according to the present invention, by a base frame to which is connected a guide rail inclined with respect to the advancing direction of the pallets and adapted to guide a slidable claw traveling along the rail in advance of the pallets, the guide rail being provided at its elevated end facing the sheet wall with a stationary retaining arm extending in an approximately vertical direction and tiltable about a horizontal axis into the advancing direction of the pallets dependent upon the advance thereof, the guide rail being further provided at its lower end remote from the retaining arm with a welding device adapted to weld the upper marginal sheet portions, the welding device being provided with transport wheels inclined relative to the sheet wall and adapted to guide the upper edges of the two adjacent marginal sheet portions, and a motor for urging against each other during the entire welding operation, with a constant force, the welding jaws of oppositely movable vertical welding jaw assemblies and clamping jaws arranged laterally of the welding jaws.

An embodiment of the apparatus of the invention which is illustrated in the appended drawings will be described in the following, by reference to the drawing wherein:

FIG. 3 is a lateral elevational view of the apparatus into which a pallet has been introduced and wrapped into a sheet, prior to applying the upper weld;

FIG. 4 is a view similar to FIG. 3 but showing the pallet during the welding operation; and FIG. 5 is a horizontal sectional view of the welding device and shows a motor arranged to urge the welding jaws against each other.

Figure 1:
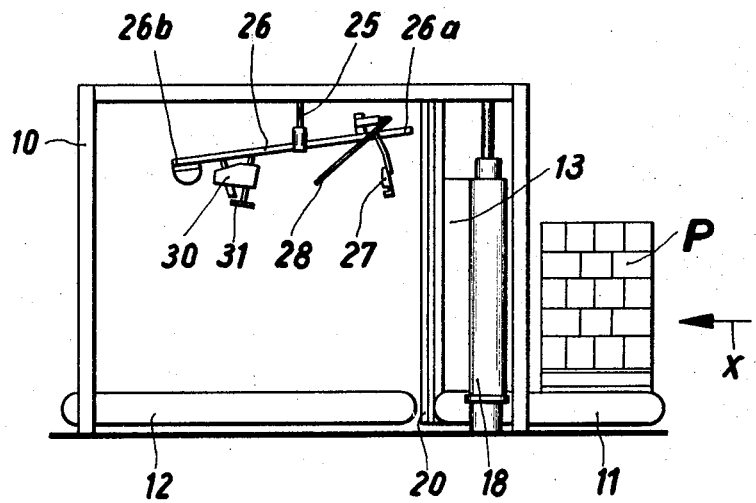
FIG. 1 is a lateral elevational view of an embodiment of an apparatus for enveloping loaded pallets with sheets and for welding the free upper marginal sheet portions of the sheet wrapper.
Figure 2:
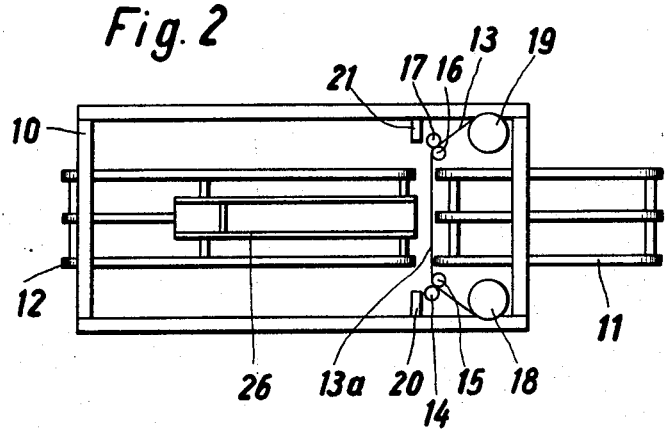
FIG. 2 is a top view of the apparatus of FIG. 1.

In the FIGS. 1–4 of the drawing the reference numeral 10 indicates a base frame at the bottom of which are provided in a tandem arrangement two conveyors 11, 12 for a loaded pallet P. The pallet P enters the apparatus and is advanced through the apparatus in the direction of the arrow $x$. At the discharge end of the conveyor 11 an enveloping sheet 13 extends transversely of the advancing direction of the pallet P. The enveloping sheet 13 is withdrawn or unwound from two supply reels 18, 19 which are arranged on either side of the conveyor 11, and is then guided through rollers 14, 15 and 16, 17, respectively. A section of the enveloping sheet 13 which extends in the form of a sheet wall into which the pallet P enters is generally indicated at 13a. Two vertical welding jaw assemblies 20 and 21 are arranged in the base frame 10 behind the sheet wall 13a. For performing a welding operation, the welding jaws are brought into mutual engagement and after the completion of the welding operation the welding jaws are again withdrawn into their initial positions shown in FIG. 2. The drive means for producing these movements are of a conventional design and are therefore not shown in the drawing. The welding jaws 20, 21 of the welding device are arranged such that either a wide weld seam or two narrow weld seams side by side will be formed thus allowing to sever the enveloping sheet at the pallet cargo from the sheet supply in simultaneously forming a new sheet wall. The severing is effected in a known manner by means of a severing knife or a hot wire.

A guide rail 26 is connected through a bracket 25 to the base frame 10 behind the sheet wall 13a and above the transport path of the pallet P. The guide rail 26 is inclined in the transport direction of the pallets so that the elevated free end 26a of the guide rail 26 faces the sheet wall 13a. The bracket 25 and the guide rail 26 may also be adjustable in height thus also allowing the successful wrapping of pallets carrying cargoes of various heights and the sealing of the wrappers at their upper open ends. A claw 27 is movable along the guide rail 26 and may engage the sheet wall 13a from behind to stretch by its own weight or by means of a biasing spring the upper marginal portion of the sheet in accordance with the tension developed in the upper edge during entry of the pallet P into the apparatus and during the unwinding of the sheet 13 from the supply reels 18, 19 (see FIG. 1).

A retaining arm 28 is mounted at the elevated free end 26a of the guide rail 26. The retaining arm 28 is, in its initial position, directed approximately vertically and is pivotably mounted on a horizontal axis, depending upon the advance of the pallet P (FIGS. 3 and 4). The retaining arm 28 may be spring biased towards its initial position. However, other types of reset devices may also be employed. At its other end 26b the guide rail 26 holds a welding device 30 having transport wheels 31 which with their axes are inclined to the vertical and tend to steadily pull the upper sheet edges of the two free marginal sheet portions upwardly thus preventing the disengagement of the sheets from the wheels 31 so that the weld may always be formed close to the top of the pallet.

The enveloping material may consist of any material that may be welded or has heat sealing properties as well as plastics impregnated webbings or sheet laminated fabrics. If, for the enveloping material, a shrink-on or snap-on sheet is employed, the apparatus for wrapping the pallets and for welding the marginal portions will be followed by a conventional shrinkage tunnel.

The operation of the apparatus of the present invention is as follows: when the claw 27 has gripped the upper edge of the sheet wall 13a and the pallet P has entered into the sheet wall 13a and has been advanced half way through the gate formed by the welding jaw assemblies 20 and 21, the retaining arm 28 is inserted between the sheet portions which are engaged with the sides of the pallet, i.e. between the two parallel upper marginal sheet portions and keeps the rear edge of the sheet wrapper F taut when the welding jaw assemblies 20, 21 have been moved to the center position and have applied a vertical weld to the sheet. Then the sheet is severed between the two welded seams in thereby simultaneously forming a new sheet wall into which a subsequent pallet may enter. Then the welding jaw assemblies 20, 21 are moved apart (FIG. 3). During the further advance of the pallet the claw 27 which has been moved by suitable means (not shown) up to the welding device 30 then pushes the tensioned front end of the upper marginal sheet portion into the welding device 30 which welds together the two side by side sheet walls which are tensioned by means of the retaining arm 28 during the further advance of the pallet P below the welding device 30 (FIG. 4). Any known method of welding may be employed such as hot gas, heated wedge, strip heater or contact welding. The transport wheels 31 of the welding device 30 prevent the upper marginal sheet portions from leaving the welding device during the welding operation thus allowing to form a weld immediately above the top of the pallet cargo. During the welding operation the retaining arm 28 is rotated in accordance with the advance of the pallet in such a manner that the upper marginal sheet portions remain taut. When the welding operation has been completed and the pallet has left the welding device 30 the claw 27 will be reset into its initial position shown in FIG. 1, and the retaining arm 28 will again be moved into an approximately vertical position allowing stretching of the upper marginal sheet portion after a subsequent pallet has been moved into a position below the guide rail 26.

Referring to FIG. 5, the welding device comprises two welding jaw assemblies 20 and 21 (FIGS. 2 and 5) which mutually oppose each other and are formed by welding jaws or welding strips which are indicated by 110, 111, 112, 113 in FIG. 5. A severing knife 114 is movably mounted between the welding jaws 110 and 111 and is adapted to sever the sheets indicated at F. The welding jaws 110, 111 are mounted on a mounting plate 115 having approximately an U-shaped profile consisting of the side flanges 115a, 115b and the connecting web 115c. The other pair of welding jaws 112, 113 is likewise mounted on a low profile mounting plate 116 carrying cylindrical guides 117, 118 connected at their lower free ends, as viewed in FIG. 5, by another connecting or mounting plate 119. The plates 116, 119 are additionally connected by a vertical bar.

At either side of the pairs of welding jaws 110, 111 and 112, 113 are arranged plate-shaped clamping jaws 120, 121 and 122, 123 respectively of which the clamping jaws 120, 121 facing the welding jaws 110, 111 and extending parallel thereto are integral with the mounting plate 115 whereas the other pair of clamping jaws 122, 123 on either side of the welding jaws 112, 113 is movably mounted. Toward this purpose, guide slides 124, 125 which are movably guided on the guide cylinders 117, 118 are connected to the inner surfaces of the clamping jaws 122, 123. These slides 124, 125 are engaged by springs 126, 127 which surround the guide cylinders so that upon opening of the welding jaws 110 – 113 the clamping jaws 122, 123 will be urged toward the clamping jaws 120, 121 by the springs 126, 127.

For opening and closing the welding jaws 110 – 113, the mounting plates 115, 116 and 119, respectively, for the welding jaws which are guided by guide rails (not shown), are connected to a continuous chain 130 or any other suitable drive means driven by a motor 131. The motor which is preferably employed for this purpose may be termed a "stopping motor" as will become apparent from the further description of its operational characteristics which follows below. The continuous chain 130 is guided by a return roller indicated at 132 and a further guide roller 133. The two chain runs are indicated at 130a and 130b. The arrangement of the welding jaw mounting plates 115, 116 and 119 respectively may correspond to the arrangement indicated in the drawing wherein the mounting plate 115 is connected to the chain run 130b and the mounting plates 116 and 119 respectively are connected to the chain run 130a of the continuous chain 130. In this arrangement, the welding jaws 110 – 113 will be opened when moving the chain 130 in the direction of the arrow $x$ whereas the two welding jaw mounting plates 115 and 116 or 119 respectively will be moved toward the center position when reversing the direction of movement of the chain 130 such as be reversing the polarity of the motor 131.

When the two welding jaw mounting plates 115 and 116 or 119 respectively are moved toward the center position the two sheets F will initially be clamped between the mounting jaws 120 – 123 which are disposed on the outside of the welding zone and during the further closing movement of the welding jaws 110 – 113 the sheets will come into contact with the welding jaws. Then the severing knife 114 will cut the two sheets at a point intermediate the two welding jaws. During this whole sequence and the subsequent welding impulse the two welding jaw mounting plates 115, 116 and 119 respectively will clamp the sheet with the maximum torque exerted by the stopping motor 131. As soon as the heat transfer from the welding jaws 110 – 113 to the sheets F has taken place the torque exerted by the stopping motor 131 is reduced by means of a suitable electric circuit (not shown) so that the welding jaw mounting plates which are spring biased by the springs 126, 127 of the outer clamping jaws 122, 123 will open somewhat — the sheets F still being clamped by the spring biased clamping jaws — i.e. will open so far that the two welds are allowed to cool down without pressure or stress being applied thereto. During cooling, the polyethylene sheet will shrink and reinforce the seam and particularly the transition zone from seam to sheet so that the weld will attain a strength equal to or even greater than that of the sheet. After cooling, the welding and clamping jaws are opened by reversing the polarity of the stopping motor 131 in thus freeing the sheets F.

The apparatus of the present invention allows to wrap loaded pallets with sheet material and to seal the sheet wrapper at its open top portion during the further advance of the pallet. This operation does not require any interruption in the advance of the pallet. Additional operators are no longer required since the wrapping of the pallets and the sealing of the sheet wrappers is effected fully automatically. The pallets which have been wrapped in this manner are fully protected against dust and moisture so that goods which are sensitive to moisture do not require any special protective coating of their own.

We claim:

1. A method of welding the marginal portions of sheet material, particularly of shrink-on-sheet material, wrapped around the cargo on loaded pallets, comprising the steps of moving loaded pallets along an advancing path of travel, extending a wall of sheet material transversely across the advancing path of travel of the loaded pallets, advancing individual loaded pallets into the wall of sheet material for laterally enveloping the loaded pallet in the sheet material, vertically sealing the sheet material to the rear of the loaded pallet and severing the vertically sealed sheet wrapped about the loaded pallet from the supply of sheet material so that a freshly formed wall of sheet material is provided downstream of the wrapped loaded pallet, wherein the improvement comprises the steps of gripping the upper edge of the sheet material above the loaded pallet at the forward end thereof in the advancing direction as the pallet moves into the wall of sheet material, pulling the sheet material along the upper edge downwardly by an amount which is governed by the extension of the sheet material in the advancing direction resulting from the withdrawing of the sheet material from its supply for bringing the laterally arranged upper edge marginal portions of the sheet material into engagement with each other, after severing the sheet material in the vertical direction at the location of the vertical weld, holding the upper edge marginal portions at a position spaced downstream from the forward end position at which the gripping action is employed, stretching the upper edge marginal portions which are in engagement with one another, and welding the upper edge marginal portions together as the loaded pallet continues its advancing path of movement for sealing the sheet material across the top of the loaded pallet.

2. Apparatus for welding the marginal portions of sheet material, particularly of shrink-on-sheet material, wrapped around the cargo on loaded pallets, comprising means for moving individual loaded pallets along an advancing path of travel, means for stretching a wall of the sheet material transversely across the advancing path of travel of the loaded pallets so that the loaded pallets are enveloped in the sheet material as the pallet moves into the wall of sheet material, a welding device for welding vertically extending portions of the sheet material on the downstream side of the loaded pallet after it has been enveloped by the sheet material, and severing means for cutting the sheet material in vertical direction at the location of the vertical weld effected by said welding device for separating the sheet material enveloping the loaded pallet from and forming a new wall of sheet material for enveloping the next loaded pallet, wherein the improvement comprises that said means for moving individual loaded pallets comprises a base frame extending upwardly above the advancing path of travel of the loaded pallets, a guide rail mounted on said frame above the advancing path of travel and inclined downwardly in the advancing direction of the loaded pallet so that its forward end in the advancing direction is lower than its rearward end, a claw slidably mounted on said guide rail for movement therealong in the advancing direction of the loaded pallet, a tiltable retaining arm secured to the rearward end of said guiderail for pivotal movement about a horizontal axis in the advancing direction of the loaded pallet, a welding device attached to the lower forward end of said guide rail for welding the upper margin portions of the sheet material located above the loaded pallet, and said welding device including transport wheels inclined relative to the sheet material for guiding the upper edges of the upper marginal portions of the sheet material during the welding action.

3. Apparatus, as set forth in claim 2, wherein said welding device for welding the vertically extending portions of the sheet material includes a pair of oppositely disposed welding jaw assemblies including welding jaws and clamping jaws arranged laterally of said welding jaws, and a motor for urging said welding jaws against each other with a constant force during the entire welding operation.

4. Apparatus, as set forth in claim 2, wherein said guide rail together with said claw, said retaining arm, and said welding device mounted thereon are adjustable in elevation.

5. Apparatus, as set forth in claim 3, wherein means are arranged for spring biasing and movably guiding said clamping jaws which hold the sheet material in a predetermined position during the vertical welding operation, and said clamping jaws being positioned on the upstream and downstream side of said welding jaws in said welding jaw assemblies in the advancing direction of the loaded pallets.

6. Apparatus, as set forth in claim 3, wherein a mounting plate is associated with each of said welding jaw assemblies, a continuous chain, motor driven means for driving such continuous chain and for forming a pair of chain runs, a guide arm for connecting each of said mounting plates to one of the chain runs of said continuous chain, one of said mounting plates extending laterally of said welding jaw assembly, a second mounting plate associated with said welding jaw assembly from which the one of said mounting plates extends laterally, cylinder guides positioned on said second mounting plate, said cylinder guides connected at the ends thereof opposite said second mounting plate to said welding jaws of said welding jaw assembly associated therewith, spring biased guide slides mounted on said cylinder guides and connected to said movably guided clamping jaws associated with said welding jaw assembly incorporating said cylinder guides.

7. Apparatus, as set forth in claim 6, wherein said motor drive means for said continuous chain comprises a motor having a reversible polarity and arranged to afford a reducible torque on said welding jaw assembly through the medium of said chain.

* * * * *